US007340458B2

(12) United States Patent
Vaithilingam et al.

(10) Patent No.: US 7,340,458 B2
(45) Date of Patent: Mar. 4, 2008

(54) META-DESCRIPTOR FOR MULTIMEDIA INFORMATION

(75) Inventors: Gandhimathi Vaithilingam, Briar Cliff Harbor, NY (US); Mohamed S. Abdel-Mottaleb, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1003 days.

(21) Appl. No.: 10/139,177

(22) Filed: May 6, 2002

(65) Prior Publication Data

US 2002/0159640 A1 Oct. 31, 2002

Related U.S. Application Data

(63) Continuation of application No. 09/347,214, filed on Jul. 2, 1999, now Pat. No. 6,411,724.

(51) Int. Cl.
*G06F 17/30* (2006.01)

(52) U.S. Cl. ............... 707/5; 707/3; 707/6; 707/10; 707/104.1

(58) Field of Classification Search ............. 707/3, 707/104.1, 45, 6, 4; 382/305, 100, 190
See application file for complete search history.

(56) References Cited

U.S. PATENT DOCUMENTS

| | | | | |
|---|---|---|---|---|
| 5,579,471 | A * | 11/1996 | Barber et al. | 715/700 |
| 5,943,443 | A * | 8/1999 | Itonori et al. | 382/225 |
| 6,108,619 | A | 8/2000 | Carter et al. | 704/9 |
| 6,243,713 | B1 | 6/2001 | Nelson et al. | 707/104 |
| 6,373,979 | B1 * | 4/2002 | Wang | 382/165 |
| 6,438,170 | B1 * | 8/2002 | Hackett et al. | 375/240.16 |
| 6,445,834 | B1 * | 9/2002 | Rising, III | 382/305 |
| 6,490,370 | B1 * | 12/2002 | Krasinski et al. | 382/195 |
| 6,512,850 | B2 * | 1/2003 | Yaung | 382/225 |
| 6,564,263 | B1 * | 5/2003 | Bergman et al. | 709/231 |
| 6,941,325 | B1 * | 9/2005 | Benitez et al. | 707/200 |

OTHER PUBLICATIONS

Li et al, "Multimedia Content Description in the InfoPyramid", IEEE Int. Conference on Acoustics, Speech and Signal Processing, May 12-15, 1998, pp. 3789-3792.
Oxkarahan et al., "Multi-Media Document Representation and Retrieval", ACM Computer Science Conference proceedings, Mar. 1991, pp. 420-429.

(Continued)

*Primary Examiner*—Cam Y T Truong (57) ABSTRACT

Multimedia information retrieval is performed using meta-descriptors in addition to descriptors. A "descriptor" is a representation of a feature, a "feature" being a distinctive characteristic of multimedia information, while a "meta-descriptor" is information about the descriptor. Meta-descriptors are generated for multimedia information in a repository (10, 12, 14, 16, 18, 20, 22, 24) by extracting the descriptors from the multimedia information (111), clustering the multimedia information based on the descriptors (112), assigning meta-descriptors to each cluster (113), and attaching the meta-descriptors to the multimedia information in the repository (114). The multimedia repository is queried by formulating a query using query-by-example (131), acquiring the descriptor/s and meta-descriptor/s for a repository multimedia item (132), generating a query descriptor/s if none of the same type has been previously generated (133, 134), comparing the descriptors of the repository multimedia item and the query multimedia item (135), and ranking and displaying the results (136, 137).

13 Claims, 2 Drawing Sheets

OTHER PUBLICATIONS

International Organization for Standardization ISO/IEC JTC 1/sc29/WG11 Coding of Moving Pictures and Audio, MPEG-7 vol. 8, No. N2728, Mar. 1999.

Journal of Virtual Communication and Image Representation, vol. 10, pp. 1-23, 1999.

"Supporting Content-Based Queries over Images in MARS, Proceedings of the IEEE International Conference on Multimedia Computing and Systems," Jun. 3-6, 1997, pp. 632-633.

"Multimedia Analysis and Retrival System", Proceedings of the 3rd International Workshop on Information Retrieval Systems, Sep. 25-27, 1997, pp. 39-45.

Query by Image Example: The CANDID Approach, in SPIE, vol. 2420, Storage and Retrieval for Image and Video Databases 111, 1995, pp. 238-248.

"Algorithms for Clustering Data", Prentice Hall Advanced Reference Series, 1988, p. 1.

International Organization for Standardization ISO/IEC JTC 1/sc29/WG11 Coding of Moving Pictures and Audio, MPEG-7 vol. 8, No. N2727, Mar. 1999.

International Organization for Standardization ISO/IEC JTC 1/sc29/WG11 Coding of Moving Pictures and Audio, MPEG-7 vol. 11, No. N2729, Mar. 1999.

* cited by examiner

| MM_INFO_NO | DV | MDV | MM_SOURCE | COMMENT |
|---|---|---|---|---|
| MM01 | DV01 | MDV01 | LINK TO FILE01 | DIGITAL STILL IMAGE |
| MM02 | | MDV02 | LINK TO FILE02 | DIGITAL STILL IMAGE |
| MM03 | DV03 | MDV03 | LINK TO FILE03 | DIGITAL STILL IMAGE BLOCK 1/2 |
| MM04 | DV04 | MDV04 | LINK TO FILE03 | DIGITAL STILL IMAGE BLOCK 2/2 |
| MM05 | | | LINK TO FILE05 | DIGITAL STILL W/ EMBEDDED DV, MDV |
| MM06 | | | LINK TO URL | DIGITAL STILL W/ EMBEDDED DV, MDV |
| MM07 | | MDV07 | | VCR TAPE W/ EMBEDDED DV |
| MM08 | DV08 | MDV08 | | STILL IMAGE PRINT IN DRAWER 08 |
| | | | | |

META-DESCRIPTOR FOR MULTIMEDIA INFORMATION

CROSS REFERENCE TO RELATED APPLICATIONS

This is a continuation of application Ser. No. 09/347,214, filed Jul. 2, 1999 now U.S. Pat. No. 6,411,724.

BACKGROUND OF THE INVENTION

The present invention relates to content-based processing of multimedia data, and more particularly to creation and use of attributes of multimedia data that are descriptive of the content thereof.

Multimedia information typically exists in various inhomogeneous forms, including, for example, digital, analogue (e.g., VCR magnetic tape and audio magnetic tape), optical (e.g., conventional film), image (e.g., pictures and drawings on paper), and so forth. The ability to locate this multimedia information is important in modem society, and is particularly important in various professional and consumers applications such as, for example, education, journalism (e.g., searching speeches of a certain politician using his name, his voice or his face), tourist information, cultural services (e.g., history museums, art galleries, and so forth), entertainment (e.g., searching for a game or for karaoke titles), investigation services (e.g., human characteristics recognition and forensics), geographical information systems, remote sensing (e.g., cartography, ecology, natural resources management, and so forth), surveillance (e.g., traffic control, surface transportation, nondestructive testing in hostile environments, and so forth), biomedical applications, shopping (e.g., searching for clothes that you like), architecture, real estate, interior design, social (e.g., dating services), and film, video and radio archives. Unfortunately, present systems are not thorough, quick or efficient in searching multimedia information; see, e.g., International Organisation for Standardisation ISO/IEC JTC1/SC29/WG11 Coding of Moving Pictures and Audio, MEPG-7 Applications Document V.8, No. N2728, March 1999, which is hereby incorporated herein by reference in its entirety.

An important step in support of searching multimedia information is to represent it in a form that is searchable using modem computer systems. Much interest has been expressed in developing forms of audio-visual information representation that go beyond the simple waveform or sample-based representations, the compression-based representations such as MPEG-1 and MPEG-2, and the object-based representations such as MPEG-4, and that can be passed onto, or accessed by, a device or a computer code. Numerous proprietary solutions have been developed for describing multimedia content and for extracting the representations and querying the resulting collections of representations, but these have only proliferated yet more heterogeneous multimedia information and exacerbated the difficulties of conducting quick and efficient searches of multimedia information.

A "descriptor" is a representation of a feature, a "feature" being a distinctive characteristic of multimedia information regardless of the media or technology of the multimedia information and regardless of how the multimedia information is stored, coded, displayed, and transmitted. Since descriptors used in different proprietary multimedia information retrieval systems are not necessarily compatible, interest has been expressed in creating a standard for describing multimedia content data that will support the operational requirements of computational systems that create, exchange, retrieve, and/or reuse multimedia information. Examples include computational systems designed for image understanding (e.g., surveillance, intelligent vision, smart cameras), media conversion (e.g., speech to text, picture to speech, speech to picture), and information retrieval (quickly and efficiently searching for various types of multimedia documents of interest to the user) and filtering (to receive only those multimedia data items which satisfy the user's preferences) in a stream of audio-visual content description.

Accordingly, a need exists for a standard for describing multimedia content data that will support these operational requirements as well as other operational requirements yet to be developed.

SUMMARY OF THE INVENTION

Accordingly, an object of the present invention as realized in particular embodiments is to improve the efficiency of retrieval of multimedia information from a repository.

Another object of the present invention as realized in particular embodiments is to improve the speed of retrieval of multimedia information from a repository.

Yet another object of the present invention as realized in particular embodiments is to provide a standard representation of a feature of multimedia information.

These and other objects are achieved in the various embodiments of the present invention. For example, one embodiment of the present invention is a method of representing a plurality of multimedia information, comprising acquiring descriptors for the multimedia information, generating at least one meta-descriptor for the descriptors, and attaching the at least one meta-descriptor to the multimedia information.

Another embodiment of the present invention is a method of representing a plurality of multimedia information which collectively is of various content types, comprising acquiring descriptors for the multimedia information, generating clusters of the descriptors, generating meta-descriptors for the clusters, and respectively attaching the meta-descriptors for the clusters to items of the multimedia information described by the descriptors in the clusters.

A further embodiment of the present invention is a method of searching multimedia information in a repository described by descriptors using a query multimedia information item, comprising acquiring meta-descriptors of the repository descriptors, selecting query multimedia information, extracting at least one query descriptor from the query multimedia information based on the meta-descriptors to obtain at least one query descriptor, comparing the query descriptor with the repository descriptors, and ranking at least some of the multimedia information in the repository in accordance with the comparing step.

Another embodiment of the present invention is a method of retrieving multimedia information from a repository, comprising extracting repository descriptors from the multimedia information in the repository, generating clusters of the repository descriptors, indexing the repository descriptors to the multimedia information in the repository, generating meta-descriptors for the clusters, attaching the meta-descriptors for the clusters to the respective multimedia information in the clusters, selecting query multimedia information, extracting at least one descriptor from the query multimedia information based on the meta-descriptors to obtain at least one query descriptor, comparing the query descriptor with the repository descriptors, and ranking at least some of the multimedia information in the repository in accordance with the comparing step.

A further embodiment of the present invention is a data structure for representing information about a plurality of descriptors that are representations of features of an item of multimedia information belonging to a particular category of multimedia content, comprising a plurality of data elements indicating relevancy of the descriptors in describing the item of multimedia information.

DETAILED DESCRIPTION OF THE PREFERRED EMBODIMENT

Figure 1:
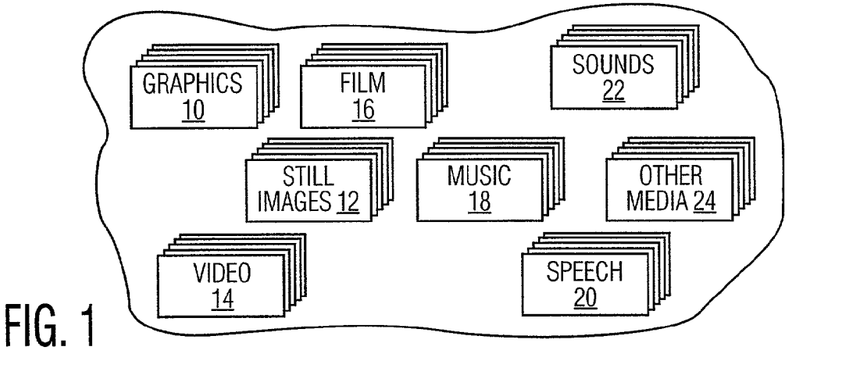
FIG. 1 is a pictorial representation of various forms of multimedia data in a repository.

Examples of the various forms in which multimedia data may exist are shown in FIG. 1, and include multiple occurrences of, for example, graphics 10, still images 12, video 14, film 16, music 18, speech 20, sounds 22, and other media 24. These multiple occurrences may be stored differently, coded differently, transmitted differently, exist on different media, or have been produced with different technologies. The multimedia data may be stored in one place or distributed throughout the world; for example, digitized multimedia of interest to a user may be stored in a self-contained relational or object-oriented data base, or in separate independent data bases implemented in different technologies and stored on different proprietary computers scattered throughout the world and accessible only over the Internet. Indeed, non-digital multimedia of interest to a user similarly may be stored in one collection under the control of a single entity, or widely scattered in different collections under the control of different entities. Regardless of the form in which the multimedia information exists and how it is stored, the user would prefer to view the collection of multimedia information as a single repository, as shown by the reference numeral 1, for purposes of efficiently searching for specific multimedia data.

We have found that multimedia information retrieval that uses meta-descriptors in addition to descriptors is not only efficient in identifying multimedia information but is also able to identify multimedia information that has been represented in a variety of different ways. A "descriptor" is a representation of a feature, a "feature" being a distinctive characteristic of multimedia information, while a "meta-descriptor" is information about the descriptor. A meta-descriptor is different from but related to the general concept of meta-data, which is a well known way of embedding additional information. For example, meta-data in documents may include format of the images in the document, and meta-data in a database may include value constraints or statistical information for an attribute in a relation. Specifically, a meta-descriptor for an item of multimedia information identifies those parts of a descriptor for that item of multimedia information that contain the most useful information for identifying that item of multimedia information.

The concept of meta-descriptor is based on the premise that a given multimedia information item is best qualified to know what describes it best, and indicating this information greatly enhances content based retrieval. Advantageously, meta-descriptors enable computerized searches for multimedia information to be done more quickly due to the generally smaller size of meta-descriptors, as well as more efficiently due to the elimination of less relevant information.

Although many multimedia retrieval techniques are adaptable to the use of meta-descriptors, a preferred technique for searching multimedia information using meta-descriptors is the scenario search, or query-by-example. In a query-by-example search of, illustratively, images, a particular still image is specified as the basis for querying the repository. The query is specified either by the initiator of the query, which may be a human user or an automated process, for example, or by retrieval algorithms used in the retrieval process. The query is formed based on a feature or features indicated in the meta-descriptors of the multimedia information in the repository to be important. Descriptors for the feature or features are extracted from the query multimedia information and compared with descriptors extracted from the repository multimedia information to obtain similarity measures, which are used to select one or more "matching" items of multimedia information. In some instances, meta-descriptors for the repository multimedia information may immediately indicate an obvious and large dissimilarity in content, thereby obviating the computations to perform extraction of descriptors and comparison of features for the query and the particular repository multimedia information. If the user is not an information retrieval expert, preferably the particular feature or features used in the retrieval of matching multimedia information are transparent to the user for simplicity of use.

Figure 2:
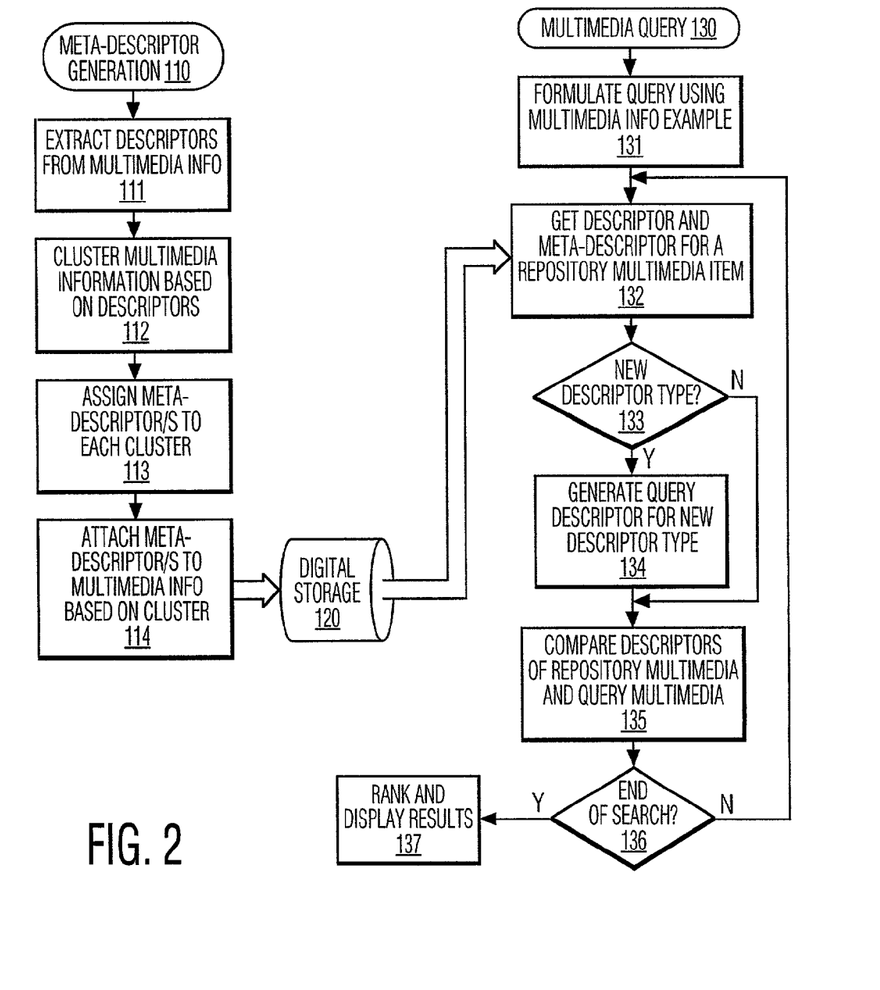
FIG. 2 is a flowchart of a meta-descriptor generation process and a multimedia query process, in accordance with the present invention.

FIG. 2 is a flowchart showing processes for generating meta-descriptors for repository multimedia information and for performing a query of the repository. Although meta-descriptors may be used for any type of multimedia information, the example illustrated in FIG. 2 is based on still images to facilitate the description. A method 110 for generating meta-descriptors is illustrated by the principal steps 111-114, and a method 130 for querying a multimedia repository such as shown in FIG. 1 is illustrated by the principal steps 131-137. The meta-descriptor generation method 110 is an unsupervised or automated method of machine learning, although meta-descriptors may also be generated by formalizing user input by a human or by a hybrid of semi-automatic techniques. The query method 130 preferably is automated except for the user's formulation of a query. Various aspects of descriptor generation and multimedia information retrieval are well known and are described in various publications, including, for example, Yong Rui, Thomas S. Huang, and Shih-Fu Chang, Image Retrieval: Past, Present, and Future, Journal of Visual Communication and Image Representation, Oct. 1-23 (1999); Sharad Mehrotra, Yong Rui, Michael Ortega-Binderberger, and Thomas S. Huang, Supporting Content-based Queries over Images in MARS, Proceedings of the IEEE International Conference on Multimedia Computing and Systems, Jun. 3-6, 1997, Chateau Laurier, Ottawa, Ontario, Canada, 1997, pp. 632-633; Sharad Mehrotra, Yong Rui, Kaushik Chakrabarti, Michael Ortega-Binderberger, and Thomas S. Huang, Multimedia Analysis and Retrieval System, Proceedings of the $3^{rd}$ International Workshop on Information Retrieval Systems, Como, Italy, Sep. 25-27, 1997, pp. 39-45; and Patrick M. Kelly, Michael Cannon, and Donald R. Hush, Query by Image Example: the CANDID Approach, in SPIE Vol. 2420 Storage and Retrieval for Image and Video Databases III, 1995, pp. 238-248, which are incorporated herein by reference in their entirety.

The first step 111 in the meta-descriptor generating method 110 is extraction of descriptors from multimedia ("MM") information. Descriptor extraction algorithms and software as well as indexing algorithms and software are well known in the art, and examples are described in the aforementioned publications. Except for constraints imposed by any relevant standards, any one or combination of descriptor extraction techniques may be used as desired. Typically, descriptors extracted from still images, for example, include color, shape, texture and sketch, although the specific descriptor extracted in any one instance depends on the software used in an automated process, the actions of the user in a manual process, or the interactions of the user and the software in a hybrid process. Automated processes are advantageous since they can process large amounts of multimedia information in the repository without requiring significant human intervention. Typically, automated processes that operate on still images do not operate on a semantic level, which is to say that they do not describe a family portrait in such terms, but rather produce values of color, shape, texture and sketch for perhaps the entire still image, or perhaps for multiple blocks into which the image has been divided.

The next step 112 is to cluster the multimedia information based on the descriptors, although other techniques may be used if desired and examples are described in the aforementioned publications. Essentially, clustering is grouping of similar multimedia information from a large mixed data set—clustering is not needed for small repositories of same-content type information—based on certain criteria applied to the descriptors. A cluster is a set of entities which are alike, and entities from different clusters are not alike. Extraction of meta-descriptors may be done by supervised or unsupervised clustering. Extraction of meta-descriptors by supervised clustering involves clustering multimedia content based on its features, given a set of cluster representatives that have been previously assigned a label or a descriptor. The images in each cluster are then assigned the label or the descriptor of that cluster's representative. Extraction of meta-descriptors by unsupervised clustering involves clustering multimedia content based on each described feature. For example, a set of images have a first cluster representation based on their color features and have a second cluster representation based on their texture features. Based, for example, on the comparison of the clusters for each feature using programmed metrics to calculate how clearly defined and compact the clusters are, one feature or a few features are found to out perform others in describing a given image. For example, a certain image may belong to a very compact and clearly defined cluster in the set of clusters based on color features, but may belong to a cluster with a wide spread and overlap in the set of clusters based on texture features. The color feature accordingly is chosen as the meta-descriptor for the image, since it classifies the image better than the texture feature in their respective feature spaces.

Mathematically, a cluster is an aggregation of points in the test space such that the distance between any two points in the cluster is less than the distance between any point in the cluster and any point not in it. See, e.g., Anil K. Jain and Richard C. Dubes, Algorithms for Clustering Data, Prentice Hall Advanced Reference Series, 1988, p. 1. Cluster analysis is the process of classifying objects into subsets that have meaning in the context of a particular problem. The objects are thereby organized into an efficient representation that characterizes the population being sampled. The relationship between objects is represented in a proximity matrix in which rows and columns correspond to objects. If the objects are characterized as patterns, or points in d-dimensional metric space, the proximity can be distance between pairs of points, such as Euclidean distance. Typically, the proximity matrix is the one and only input to a clustering algorithm. The objects being clustered could be different species of plants, pixels in a digital image or documents on different topics. Cluster analysis finds several applications in pattern recognition and image processing. Cluster analysis is used for feature selection, in applications involving unsupervised learning, and in aiding machine learning and knowledge representation in artificial intelligence.

Descriptors extracted from still images typically are vectors of multidimensional numbers representing a collection of points in space. In the simple case, the clustering algorithm compares distances in a collection of points in 2D space to determine how close the points are. In more advanced algorithms, the concept is extended to multidimensional space. To ensure consistency, the clustering process is applied preferably to only multimedia information processed with the same extraction algorithm. For still images, clustering is based on similarity of typically low level features; for example, certain images from which clear patterns emerge for a particular color and texture (for example, such as would be generated from a beach scene) but with otherwise indefinite results for sketch and shape may be considered to be in the same cluster. Unsupervised clustering algorithms typically work iteratively, refining their results until a threshold point specified by the user is achieved.

The next step 113 is to assign meta-descriptors to each cluster. For example, where a pattern emerges only for color, a meta-descriptor of color 100% is assigned to the cluster. Where a pattern emerges only for sketch, which would be expected for mono-chromatic engineering drawings, for example, a meta-descriptor of sketch 100% is assigned to the cluster. For the particular cluster of still images of the previous example in which clear patterns emerge only for a particular color and texture, a meta-descriptor of color 50% and texture 50% is assigned to the cluster. If process automation is desired, weights may be assigned using heuristic rules, which are based on statistical information from past experiences with multimedia information. Alternatively, meta-descriptors may be assigned manually, if desired, or in a semi-automatic way with human interaction, if desired.

Meta-descriptors may take whatever form is convenient for the programmer. In one particularly compact form, the meta-descriptor is a binary vector X, each bit $x_i$ indicating the relevance ($x_i = i^{th}$ feature is relevant) of a feature given a fixed number of ordered features for that category of multimedia content. In the case of a still image, for example, a suitable vector is a four bit vector in which a binary 1 or 0 indicates the importance or irrelevancy, respectively, of color, shape, texture and sketch in describing the multimedia information. If only color is important in a particular still image, a suitable meta-descriptor is 1000.

A notation that is able to assign specific weights uses a weighted vector X, each element of the vector $x_i$ indicating the weight assigned to the $i^{th}$ feature given a fixed number of ordered features for that category of multimedia content. If say color and sketch are both important but have different weights, a suitable meta-descriptor of this type is "70,0,0, 30" indicating that color has a 70% weight and sketch has a 30% weight.

Another form is string notation, which is capable of handling not only different weights but also different extraction algorithms and sectioning of the still image into multiple blocks. Moreover, the string representation allows for new features to be considered in the meta-descriptor later in time. In string notation, each character or group of characters in the string indicates the relevance of a feature given a set of features in accordance with a predefined standard notation. Consider, for example, a set of four valid color descriptor types: (1) a single histogram for an entire image in RGB color space; (2) twenty-five histograms for the image in RGB color space that is divided into a 5×5 grid, each of the resulting twenty-five blocks being represented by a histogram; (3) a single histogram for the entire image in YUV color space; and (4) twenty-five histograms for the image in YUV color space that is divided into a 5×5 grid, each of the resulting twenty-five blocks being represented by a histogram. Assume that these descriptor types are numerically ordered from 1 to "n," n being the number of valid descriptor types, here four. A suitable string meta-descriptor for a still image that is best described by, for example, the first and fourth color descriptors is "C214" meaning: the color feature is relevant (C) and is obtained with two (2) color representations from a pre-defined set of color representations, namely the first and fourth (14) color representations from the pre-defined set of color representations. String notation is particularly flexible, allowing not only different color spaces (for example, RGB and YUV) to be identified but also allowing each color space to be calculated differently (for example, as one block, a set of ten blocks, a set of 100 blocks, and so forth). Extensions of string notation can also handle different extraction algorithms by appropriate predefined codes.

Meta-descriptors of different forms may be used for different multimedia information, and any information not provided for in the particular form of meta-descriptor can be furnished by default. For example, if the default descriptor extraction method and the default color space are used, a binary meta-descriptor is adequate.

The next step 114 is to attach meta-descriptors to multimedia information based on cluster information. A variety of different "attachment" techniques are well known and may be selected for use based on the media type and manner of accessing it, and different attachment types may be used within a particular data base of meta-descriptors. The descriptors themselves may or may not be present, although if they are not present the system must know how to calculate them, either by default or by a value in the meta-descriptor notation. Preferably, at least the meta-descriptors and their attachment data are stored in storage 120, which may be any type of data base accessible to the system. Descriptors may be stored in the storage 120 or stored with the multimedia information from which they were extracted. The multimedia information itself resides in a repository (FIG. 1) which may be as specific as other memory space in the storage device 120 or as diverse as the internet, or even so diverse as to include non-electronic forms of storage such as paper.

Once a feature is chosen to be present in the meta-descriptor for, say an image, the meta-descriptor may if desired allow for the presence of other features from a pre-defined set. To reduce the number of features to be tested for, a set of association rules derived from a labeled training set may be used, if appropriate. For example, a particular repository may contain multimedia information that is not well described by sketch, so that the retrieval system would not need to use sketch.

During extraction, features from a multimedia content may be combined, if desired, with higher level semantic information to determine the values in the meta-descriptor. For example, where the multimedia content is an image, features from the image are combined with semantic information from the text caption associated with the image to determine the values in the meta-descriptor for the image.

Figure 3:
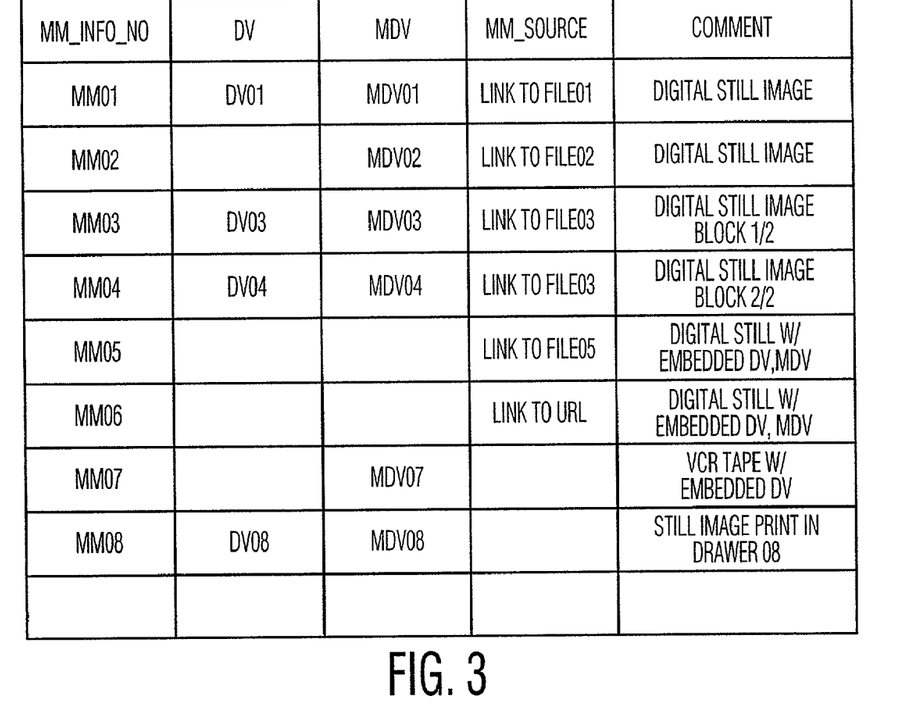
FIG. 3 is a table of records for an illustrative relational database, in accordance with the present invention.

FIG. 3 is an example of a simple multimedia information table for a relational data base file (any other type of database is suitable as well) that uses various attachment techniques. Illustratively, the table has five fields, a multimedia information number field MM_INFO_NO, a descriptor value field DV, a meta-descriptor value field MDV, a multimedia file source field MM_SOURCE, and a comment field COMMENT. The MM_INFO_NO field is a primary key field. The DV and MDV fields are character fields for containing, for example, string vectors. The MM_SOURCE field is an OLE data type that links to or embeds OLE objects such as digitized documents, drawings, pictures, sounds, and so forth. The COMMENT field is a memo data type field. If desired, the DV field may be omitted from the table provided descriptors either are embedded in the multimedia information or the retrieval system can extracted descriptors from the multimedia information. However, having descriptors in a local database will allow the retrieval system to operate more quickly.

The record identified by the primary key MM01 contains the descriptor value DV01 and the meta-descriptor value MDV01, and is attached to a digitized still image stored in FILE01 by a link in the OLE data type field. The record identified by the primary key MM02 contains the meta-descriptor value MDV02, and is attached to a digitized still image stored in FILE02 by a link in the OLE data type field. The descriptor value is extracted from the content of FILE02 during the process of querying the multimedia information in the repository. The record identified by the primary key MM03 contains the descriptor value DV03 and the meta-descriptor value MDV03 for a block of multimedia information in an image, and is attached to a digitized still image stored in FILE03 by a link in the OLE data type field. The record identified by the primary key MM04 contains the descriptor value DV04 and the meta-descriptor value MDV04 for another block of multimedia information in the same image, and is attached to a digitized still image stored in FILE03 by a link in the OLE data type field. The record identified by the primary key MM05 is attached to a digitized still image stored in FILE05 by a link in the OLE data type field. The DV and MDV fields are null for this record, since the DV and MDV are embedded in the linked file and can easily be read from it. The record identified by the primary key MM06 is attached to a digitized still image stored in another data base accessible over the Internet by a URL link in the OLE data type field. The DV and MDV fields are null for this record, since the DV and MDV are embedded in the linked file and can be read from it. The record identified by the primary key MM07 contains the meta-descriptor value MDV07, and is attached to a VCR tape. The DV field is null for this record, since the descriptor value is embedded in the vertical blanking interval on the VCR tape and can be read from it. The MM_SOURCE field is null for this record. Unless the retrieval system detects from the meta-descriptor that an obvious and large dissimilarity in content exists between the query multimedia and the VCR tape, the tape must be mounted and the descriptor must be read from the VCR tape during a query. The record identified by the primary key MM08 contains the descriptor value DV08 and the meta-descriptor value MDV08, and is attached to a still image printed on photographic paper and filed in drawer 08. The MM_SOURCE field is null for this record.

The method 130 for querying a multimedia repository such as shown in FIG. 1 is illustrated by the principal steps 131-137. Step 131 is the formation of a query by the user using any convenient method, here query-by-example. In a query-by-example, the user selects an item of multimedia information and wishes to find all matching items of multimedia information from the repository. In step 132, descriptors and meta-descriptors for an item of multimedia information in the repository is retrieved, illustratively from the storage 120. In the case of the descriptors, they may instead be stored with the multimedia information and therefor may have to be retrieved from the multimedia information, or they may be unavailable and have to be extracted again based on the values in the meta-descriptors. If the descriptor for the repository multimedia information item is of a type not previously processed in the query 130 (step 133—YES), a corresponding descriptor is extracted from the query multimedia item (step 134) by applying the extraction method and weights indicated by the meta-descriptor for the repository multimedia information item. A comparison (step 135) is then made between the query descriptor and the descriptor for the repository multimedia information item. Features given no weight in the meta-descriptor for the repository multimedia information item need not be processed for meta-descriptor extraction. The comparison is repeated for all clusters in the database (step 136—NO), and the set of closest matches from each cluster is appropriately ranked, with suitable means being well known in the art, and displayed to the user (step 137).

Figure 4:
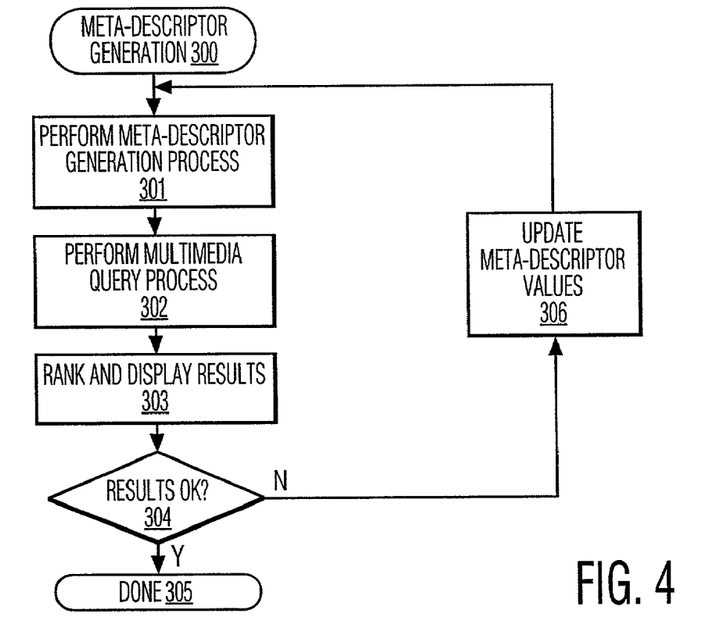
FIG. 4 is a flowchart of a process for refining meta-descriptors for multimedia in a repository, in accordance with the present invention.

A technique for optimizing meta-descriptors that involves formalizing user input by a human expert is shown in FIG. 4. For clarity in the description, a simple repository of still images is presumed. Such images typically are classifiable in just a few categories, for example, human figures, plants, landscapes, and textiles, and allow a content-based retrieval by a few methods such as color, shape, texture, and sketch. A given image in the database is best described by one or more of these features and poorly described by other features. For example, a human figure is best described by shape, plants are best described by color and texture, and landscapes are best described by texture alone. A database having these characteristics is trained using human input as follows. In step 301, a meta-descriptor generation process is performed using all of the features, illustratively color, shape, texture, and sketch—steps 112-114 of FIG. 2 are illustrative of such a process. In step 302, a multimedia query process is performed using all of the features, illustratively color, shape, texture, and sketch—steps 131-136 of FIG. 2 are illustrative of such a process. In step 303, the results are ranked by the retrieval system and displayed to the human expert. From the closest matches, the user determines which method suits the query image best, or if more than one method suits the query image, the user determines the weights for each of the suitable features using a suitable criterion. The user also indicates all of the other images in the sets of closest matches that are to be given the same weights for the suitable features. In step 306, the retrieval system updates the value of the meta-descriptors, for example, by assigning new weights for features, based on the human expert's input. Any of various iterative learning techniques may be used. An image that has not been considered at all in the training may be assigned equal weights for all the features. Steps 301, 302, 303 and 306 are repeated until the human expert is satisfied with the results, in which event the meta-descriptors are optimized and the process 300 ends.

Meta-descriptors are most effective when incorporated into a system of standards for descriptors, descriptor schemes, and descriptor definition languages, although the particular standardization scheme is not critical. An illustrative view of what a descriptor is and how it functions in a multimedia information retrieval system is set forth in: International Organisation for Standardisation ISO/IEC JTC1/SC29/WG11 Coding of Moving Pictures and Audio, MEPG-7 Requirements Document V.8, No. N2727, March 1999; and International Organisation for Standardisation ISO/IEC JTC1/SC29/WG11 Coding of Moving Pictures and Audio, MEPG-7: Context, Objectives and Technical Roadmap, V.11, No. N2729, March 1999, which are hereby incorporated herein by reference in their entirety. According to the view expressed in these documents, searching of multimedia information is performed by comparing "descriptors" and their instantiations ("descriptor values"), a descriptor being a representation of a "feature" of the multimedia information and a feature being a distinctive characteristic of the multimedia information that signifies something to somebody. A descriptor defines the syntax and the semantics of the feature representation. If desired, several descriptors may be used to represent a single feature, as when different relevant requirements need to be addressed. For example, possible descriptors for the color feature are: the color histogram, the average of the frequency components, the motion field, the text of the title, and so forth. Descriptor values are combined via the mechanism of a "description scheme" to form a "description." In particular, a description scheme ("DS") specifies the structure and semantics of the relationships between its components, which may be both descriptors and description schemes, and a description consists of a DS (structure) and the set of descriptor values (instantiations) that describe the multimedia data. A description definition language ("DDL") is a language that allows the creation of new description schemes and, possibly, descriptors. It also allows the extension and modification of existing description schemes. Table 1, which is taken from the aforementioned MPEG-7 Requirements Document V.8 (modified to include a sketch feature), exemplifies the distinction between a feature and its descriptors.

TABLE 1

| Feature | | Descriptor | |
|---|---|---|---|
| Category Type | Feature | Feature Label | Data Type |
| Spatial | texture of an object, shape of an object | | a set of wavelet coefficients, a set of polygon vertices |
| Temporal Objective | Trajectory of objects color of an object | | chain code color histogram, rgb vector, text |
| | shape of an object | | a set of polygon vertices, a set of moments |
| | texture of an object | | a set of wavelet coefficients, the set of contrast, coarseness |

TABLE 1-continued

| Feature Category Type | Feature | Feature Label | Data Type |
|---|---|---|---|
| | sketch of an object | | and directionality set of edges |
| | audio frequency content | | average of frequency components |
| Subjective | emotion (happiness, angry, sadness) | | a set of eigenface parameters, text |
| | Style | | text |
| | Annotation | | text |
| Production | Author | | text |
| | Producer | | text |
| | Director, etc. | | text, etc. |
| Composition information | scene composition | | tree graph |
| Concepts | Event | | text |
| | Activity | | text, a numeric value |

General requirements for descriptors and description schemes as proposed in the aforementioned MPEG-7 Requirements Document are supported by suitable descriptors and their meta-descriptors. Multiple types of features—suitable descriptors and their meta-descriptors support multimedia descriptions using various types of features such as: N-dimensional Spatio-temporal structure (e.g., the duration of a music segment), objective features (e.g., the number of beds in a hotel, color of an object, shape of an object, audio pitch, etc.), subjective features (e.g., how nice, happy or fat someone is, topic, style, etc.), production features (e.g., information about document creation such as the date of acquisition, producer, director, performers, roles, production company, production history, any non-IPMP production information), composition information (e.g., how a scene is composed, editing information, the user's preferences, etc.), and concepts (e.g., event, activity). Abstraction levels for the multimedia material—hierarchical mechanism to describe multimedia documents at different levels of abstraction are supported, which accommodates users' needs for information at differing levels of abstraction such as, for example, the composition of objects from sub-objects, a sequence by sequence analysis of motion in a video, and the plot structure of a video. Cross-modality—audio, visual, or other descriptors and their meta-descriptors that allow queries based on visual descriptions to retrieve audio data and vice versa are supported (for example, where the query is an excerpt of Pavarotti's voice and the result is retrieval of video clips where Pavarotti is singing and where Pavarotti is present). Multiple descriptions—the ability to handle multiple descriptions of the same material at several stages of its production process is supported, as well as descriptions that apply to multiple copies of the same material. Description scheme relationships—suitable description schemes express the relationships between descriptors and their meta-descriptors to allow for their use in more than one description scheme. The capability to encode equivalence relationships between descriptors and their meta-descriptors in different description schemes is supported. Descriptor priorities—the prioritization of descriptors and their meta-descriptors preferably is supported by the description schemes so that queries may be processed more efficiently. The priorities may reflect levels of confidence or reliability. Descriptor hierarchy—suitable description schemes support the hierarchical representation of different descriptors and their meta-descriptors in order that queries may be processed more efficiently in successive levels where N level descriptors complement (N-1) level descriptors. Descriptor scalability—suitable description schemes support scalable descriptors with their meta-descriptors in order that queries may be processed more efficiently in successive description layers. Description of temporal range—association of descriptors with their meta-descriptors to different temporal ranges are supported, both hierarchically (descriptors with their meta-descriptors are associated to the whole data or a temporal sub-set of it) as well as sequentially (descriptors with their meta-descriptors are successively associated to successive time periods). Direct data manipulation—descriptors and their meta-descriptors acting as handles referring directly to the data are supported, to allow manipulation of the multimedia material. Language of text-based descriptions—suitable descriptors with their meta-descriptors specify the language used in the description and support all natural languages. Translations in text descriptions—suitable text descriptions provide a way to contain translations into a number of different languages, in order to convey the relation between the description in the different languages.

Functional requirements for descriptors and description schemes as proposed in the aforementioned MPEG-7 Requirements Document are supported by suitable descriptors and their meta-descriptors. Retrieval effectiveness—the effective retrieval of multimedia material is supported. Retrieval efficiency—the efficient retrieval of multimedia material is supported. Similarity-base retrieval—descriptions allowing to rank-order database content by the degree of similarity with the query are supported. Associated information—the association of other information with the data is supported. Streamed and stored descriptions—both streamed (synchronized with content) and non-streamed data descriptions are supported. Distributed multimedia databases—the simultaneous and transparent retrieval of multimedia data in distributed databases is supported. Referencing analogue data—the ability to reference and describe multimedia documents in analogue format is supported (for example, providing temporal references to sequences in a VHS tape). Interactive queries—mechanisms to allow interactive queries are supported. Linking—mechanisms allowing source data to be located in space and in time are supported, including links to related information. Prioritization of related information—mechanism allowing the prioritization of related information, mentioned under Linking above, are supported. Browsing—descriptions allowing to pre-view information content in order to aid users to overcome their unfamiliarity with the structure and/or types of information, or to clarify their undecided needs, are supported. Associate relations—relations between components of a description are supported. Interactivity support—means allowing specifying the interactivity related to a description are supported (for example, tele-voting related to broadcast events). Intellectual property information—inclusion of copyright, licensing and authentication information related to Ds, DSs and descriptions is supported.

Visual specific requirements for descriptors and description schemes as proposed in the aforementioned MPEG-7 Requirements Document are supported by suitable descriptors and their meta-descriptors. Type of features—visual descriptions allowing the following features (mainly related to the type of information used in the queries) are supported: color, visual objects, texture, sketch, shape, still and moving images (e.g., thumbnails), volume, spatial relations, motion, deformation, source of visual object and its characteristics (e.g., the source object, source event, source attributes, events, event attributes, and typical associated scenes0 and models (e.g., MPEG-4 SNHC). Data visualization using the description—a range of multimedia data descriptions with increasing capabilities in terms of visualization is supported (allows a more or less sketchy visualization of the indexed data). Visual data formats—description of the following visual data formats is supported: digital video and film, such as MPEG-1, MPEG-2 or MPEG-4; analogue video and film; still pictures in electronic such as JPEG, paper or other format; graphics, such as CAD; 3D models, notably VRML; and composition data associated to video. Description of other visual data formats yet to be defined is possible. Visual data classes—descriptions specifically applicable to the following classes of visual data are supported: natural video, still pictures, graphics, animation (2-D), three-dimensional models, and composition information.

Audio specific requirements for descriptors and description schemes as proposed in the aforementioned MPEG-7 Requirements Document are supported by suitable descriptors and their meta-descriptors. Type of features—audio descriptions allowing the following features (mainly related to the type of information used in the queries): frequency contour (general trend, melodic contour), audio objects, timbre, harmony, frequency profile, amplitude envelope, temporal structure (including rhythm), textual content (typically speech or lyrics) sonic approximations (vocalization of a sonic sketch by, for example, humming a melody or growling a sound effect), prototypical sound (typical query-by-example), spatial structure (applicable to multi-channel sources, stereo, 5.1 -channel, and binaural sounds each having particular mappings), source of sound and its characteristics (e.g., the source object, source event, source attributes, events, event attributes, and typical associated scenes), and models (e.g., MPEG-4 SAOL). Data sonification using the description—a range of multimedia data descriptions with increasing capabilities in terms of sonification is supported. Auditory dataformats—the description of the following types of auditory data are supported: digital audio (e.g., MPEG-1 Audio, Compact Disc), analogue audio (e.g., vinyl records, magnetic tape media), MIDI including General MIDI and Karaoke formats, model-based audio (e.g., MPEG-4's Structured Audio Orchestra Language—SAOL), and production data Auditory data classes—descriptions specifically applicable to the following subclasses of auditory data are supported: soundtrack (natural audio scene), music, atomic sound effects (e.g., clap), speech, symbolic audio representations (MIDI, SNHC Audio), and mixing information (including effects).

Coding requirements for descriptors and description schemes as proposed in the aforementioned MPEG-7 Requirements Document are supported by suitable descriptors and their meta-descriptors. Description efficient representation—the efficient representation of data descriptions is supported. Description extraction—the use of Descriptors and Descriptions Schemes that are easily extractable from uncompressed and compressed data, according to several widely used formats is supported by the meta-descriptors. Robustness to information errors and loss—mechanisms that guarantee graceful behavior of the system in the case of transmission errors are supported.

While text specific requirements for descriptors and description schemes are not proposed in the aforementioned MPEG-7 Requirements Document, suitable descriptors and their meta-descriptors support the ability of multimedia content to include or refer to text in addition to audio-visual information, provided the text descriptions and the interface allow queries based on audio-visual descriptions to retrieve text data and vice versa, and that the descriptions of text for text-only documents and composite documents containing text should be the same.

While in some situations in which meta-descriptors are used, the search engine or filter agent (user side) may have to know the exact feature extraction algorithm employed by the meta-description generation process, the specific algorithm used for feature extraction during the description generation process is otherwise not relevant to the meta-description generation process. Hence, the meta-description process is able to accommodate technological developments in feature extraction and encourage competitive development.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. A method of searching multimedia information in a repository described by descriptors using a query multimedia information item, comprising executing operations in a data processing device, the operations comprising acts of:
   acquiring meta-descriptors of repository descriptors;
   selecting query multimedia information;
   extracting at least one query descriptor from the query multimedia information based on the meta-descriptors;
   comparing the query descriptor with the repository descriptors;
   ranking at least some of the multimedia information in the repository in accordance with the comparing act; and
   providing an output indicating the ranking, wherein the repository descriptors are instances of a plurality of different descriptor types, and where the act of extracting at least one descriptor from the query multimedia information comprises extracting a plurality of descriptors based on the meta-descriptors to obtain a plurality of query descriptors, the query descriptors being respective instances of the descriptor types; and the comparing act comprises comparing the query descriptors with respective repository descriptors having same descriptor types.

2. The method of claim. 1, wherein at least one of the query descriptors is a value repreuentng a descriptor type.

3. The method of claim 1, wherein meta-descriptors are included in the repository descriptors.

4. The method of claim 3, wherein the comparing act ccanpz ices comparing query descriptors to stored meta-descriptors.

5. The method of claim 1, wherein at least one of the query descriptors is a value representing a descriptor type.

6. A method of retrieving multimedia information from a repository, comprising executing operations in a data processing device, the operations comprising acts of:
   extracting repository descriptors from the multimedia information in the repository;
   generating clusters of the repository descriptors;
   indexing the repository descriptors to the multimedia information in the repository;
   generating meta-descriptors for the clusters;

attaching the meta-descriptors for the clusters to respective multimedia information in the clusters;
selecting query multimedia information;
extracting at least one descriptor from the query multimedia information based on the meta-descriptors to obtain at least one query descriptor;
comparing the query descriptor with the repository descriptors;
ranking at least some of the multimedia information in the repository in accordance with the comparing act; and
providing an output indicating the ranking.

7. A method as in claim 6 wherein the repository descriptors are instances of a plurality of different descriptor types, and wherein:
the act of extracting at least one descriptor from the query multimedia information comprises extracting a plurality of descriptors based on the meta-descriptors to obtain a plurality of query descriptors, the query descriptors being respective instances of the descriptor types; and
the comparing act comprises comparing the query descriptors with respective repository descriptors having same descriptor types.

8. The method of claim 6, wherein meta-descriptors are included in the repository descriptors.

9. The method of claim 8, wherein the comparing act comprises comparing query descriptors to stored meta-descriptors.

10. A method comprising executing operations in at least one data processing device, the operations comprising acts of:
maintaining a database of multimedia information, the database comprising at least one respective descriptor and at least one respective meta-descriptor attached to each piece of the multimedia information;
extracting at least one query descriptor from query multimedia information based on meta-descriptors of the multimedia information; and
comparing the query descriptor with descriptors of the multimedia information in said database;
ranking at least some of the multimedia information in the database in accordance with the comparing act; and
providing an output indicating the ranking, wherein the repository descriptors are instances of a plurality of different descriptor types, and where the act of extracting at least one descriptor from the query multimedia information comprises extracting a plurality of descriptors based on the meta-descriptors to obtain a plurality of query descriptors, the query descriptors being respective instances of the descriptor types;
and the comparing act comprises comparing the query descriptors with respective repository descriptors having same descriptor types.

11. Apparatus for searching a database of multimedia information in a repository, the apparatus comprising:
means for storing the database; and
at least one data processing device performs operations comprising the acts of:
acquiring meta-descriptors of repository descriptors;
selecting query multimedia information;
extracting at least one query descriptor from the query multimedia information based on the meta-descriptors to obtain at least one query descriptor;
comparing the query descriptor with the repository descriptors;
ranking at least some of the multimedia information in the repository in accordance with the comparing act; and
providing an output indicating the ranking, wherein the repository descriptors are instances of a plurality of different descriptor types, and where the act of extracting at least one descriptor from the query multimedia information comprises extracting a plurality of descriptors based on the meta-descriptors to obtain a plurality of query descriptors, the query descriptors being respective instances of the descriptor types;
and the comparing act comprises comparing the query descriptors with respective repository descriptors having same descriptor types.

12. Apparatus for retrieving information from a database of multimedia information, the apparatus comprising:
means for storing the database; and
at least one data processing device performs operations comprising acts of:
extracting repository descriptors from the multimedia information in the repository;
generating clusters of the repository descriptors;
indexing the repository descriptors to the multimedia information in the repository;
generating meta-descriptors for the clusters;
attaching the meta-descriptors for the clusters to the respective multimedia information in the clusters;
selecting query multimedia information;
extracting at least one descriptor from the query multimedia information based on the meta-descriptors to obtain at least one query descriptor;
comparing the query descriptor with the repository descriptors; and
ranking at least some of the multimedia information in the repository in accordance with the comparing act; and
providing an output indicating the ranking.

13. The apparatus of claim 12, wherein the act of extracting the at least one descriptor from the query multimedia information comprises extracting a plurality of descriptors based on the meta-descriptors to obtain a plurality of query descriptors, the query descriptors being respective instances of the descriptor types;
and the comparing act comprises comparing the query descriptors with respective repository descriptors having same descriptor types.

* * * * *